Figure 1:
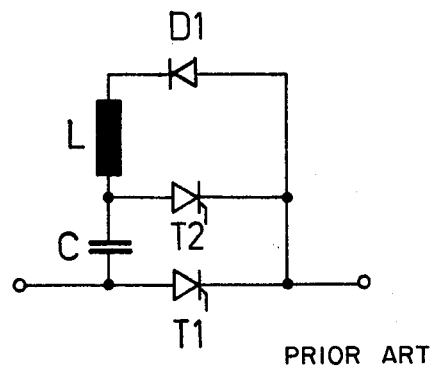

United States Patent [19]

Korb

[11] 4,030,020
[45] June 14, 1977

[54] THYRISTOR CONTROLLED DIRECT CURRENT REGULATOR

[75] Inventor: Fritz Korb, Lampertheim, Germany

[73] Assignee: BBC Brown Boveri & Company Limited, Baden, Switzerland

[22] Filed: Nov. 20, 1975

[21] Appl. No.: 633,694

[30] Foreign Application Priority Data

Nov. 21, 1974 Germany .......................... 2455132
Nov. 28, 1974 Germany .......................... 2456216

[52] U.S. Cl. ............................................. 321/45 C
[51] Int. Cl.² ......................................... H02M 1/06
[58] Field of Search ........... 321/44, 45 C; 318/138, 318/345 G, 341; 307/252 J, 252 M

[56] References Cited
UNITED STATES PATENTS 3,902,110  8/1975  Berman ........................ 321/45 C

FOREIGN PATENTS OR APPLICATIONS 38,729  11/1971  Japan ........................... 321/45 C
12,451  4/1972  Japan ........................... 321/45 C

*Primary Examiner*—William H. Beha, Jr.
*Attorney, Agent, or Firm*—Pierce, Scheffler & Parker

[57] ABSTRACT

A direct current regulator between a direct current power supply source and a load circuit includes a main thyristor and a quenching thyristor connected in parallel with the main thyristor through a series connection of a quenching condenser and inductive reactance. A change-over thyristor is connected into the circuit of the quenching thyristor, another thyristor is provided for recharging the condenser and a control unit is provided for gating the various thyristors to set their required ignition periods. The main thyristor connected in the lines leading from the voltage source to the load circuit is relieved of the charging as well as the change-over function by the use of additional thyristors, thus attaining a wider range of adjustment for the output voltage, and only one reactor component is required for the thyristor-controlled quenching and change-over circuits.

7 Claims, 6 Drawing Figures

THYRISTOR CONTROLLED DIRECT CURRENT REGULATOR

The present invention concerns a direct current regulator with a main thyristor and a quenching thyristor which are placed jointly by way of one electrode onto one pole of the load circuit, its other pole being connected directly to one pole of the voltage source at the input side, with a quenching condenser, one of the electrodes of the condenser being connected to the main thyristor and the other electrode being placed at the quenching thysistor by way of a change-over reactor, and with a control unit. The invention concerns further a control system for the operation of the direct current regulator.

Direct current regulators are used for the connection of a d.c. power supply of constant voltage with a d.c. load circuit of variable voltage. This problem can be solved only by means of self-driven converters.

In addition to its usefulness for the above-described application, the direct current regulator is important because it is the basic circuit for a number of circuit variants of the converter technology.

A relatively simple direct current regulator possessing the above-listed circuit components is known (see Heumann/Stumpe, "Thyristoran" (1969), page 154). This known direct current regulator is illustrated in FIG. 1. It operates at an extremely high current slope (di/dt) during the quenching of the main thyristor T 1. The quenching current flows through the components C - T 2 - T 1. The inductive reactor L becomes active only during the change-over process and during this part of the operation the current flows in the form of a sinusoidal half-oscillation through the components T 1 - D 1 - L - C.

The known circuits are also limited in their range of adjustment:

The highest attainable output voltage of the direct current regulator is smaller than the supply voltage even if the components operate loss-free. For the charge conservation of the condenser it becomes necessary to quench and re-ignite the main thyristor periodically causing a loss of the corresponding time interval for the turn-on of the supply voltage across the main thyristor.

The lowest possible output voltage is guided by the fact that the main thyristor must be energized at least for the duration of the change-over process, and the supply voltage will thus reach the consumer during the corresponding time interval.

Since the length of the recharge interval is functionally related to the magnitude of the consumer current, the range of adjustment will be restricted more severely in the case of low currents.

Also known are so-called push-pull quenching circuits (see the above mentioned Heumann/Stumpe publication, page 156), where there is no need for a change-over of the quenching condenser by way of a reactor for the preparation of the next quenching action. Circuits of this type make necessary a more extensive use of valves. The range of adjustments is again limited in the manner as explained above.

The primary object of the invention is to attain, while using the above-described direct current regulator as a basis, a range of adjustment which is limited in direction of a maximum output voltage solely by the available input voltage, and in direction of a minimum output voltage to a value of zero, and to attain this objective merely by a slight increase in components within the heavy current section.

The invention solves this problem thusly that in order to facilitate and to delimit time-wise the charge process of the quenching condenser there is provided a charge thyristor, and for the change-over process there is provided a change-over thyristor, and that the control unit is designed for the full range of adjustments.

Preferably, the circuit arrangement proposed by the invention is designed in such manner that the quenching condenser is connected by one of its electrodes to one pole of the load circuit in series with the change-over reactor and the quenching thyristor, that, with the load circuit being inductive, a free-running diode is connected in parallel with the load circuit, and that between the other electrode of the quenching condenser, connected to one pole of the supply voltage, and the other pole of the supply voltage there are placed the change-over thyristor and the charge thyristor is gating directing and in series, a nodal point between change-over and charge thyristors being connected with a nodal point between the change-over circuit and quenching thyristor.

Another variant, particularly advantageous for the no-load operation, will be explained below in connection with the description of the drawing.

Obviously, a gate control forms part of the above defined heavy current section, and it is an additional aim of the invention to establish a control system for the drive of the thyristors of the direct current regulator which will make possible a substantially non-limited range of adjustments.

The invention solves this specific aim in that manner that for the control of the regulator output voltage, an interval $a$ (see FIG. 3) of the control pulse of the quenching thyristor is varied relative to the control pulse of the main thyristor and if sufficiently removed from the ultimate limits of adjustment the charge thyristor is ignited later than the quenching thyristor by a specific time $b$, and the change-over thyristor in turn is ignited later than the charge thyristor by a specific time $c$, whereby the times $b$ and $c$ are determined on the basis of the current condition and release times.

In the case of this control system as defined by the invention it will be advantageous if, upon the approach to the maximum output voltage, the timed position of the control pulse for the charge thyristor can be shifted maximally up to the position of the control pulse for the main thyristor, and that the control pulse for the quenching thyristor can be shifted further up to the position of the control pulse for the main thyristor.

Furthermore, upon the approach to the minimum output voltage, the shift of the control pulse for the quenching thyristor is to be limited up to the position of the control pulse for the main thyristor, and the control pulse for the main thyristor is to be blocked in the case of any further unidirectional change in the control voltage, while the control pulse for the charge thyristor is allowed to shift up to the position of the blocked pulse of the main thyristor.

The control system proposed by the invention makes superfluous in an advantageous manner supplementary circuit components, such as auxiliary valves and reactance coils, needed and used in the case of the known circuit arrangements.

The control unit results from the above-described functions of the control method or system respectively, and is thus part of the scope of this invention.

Figure 2:
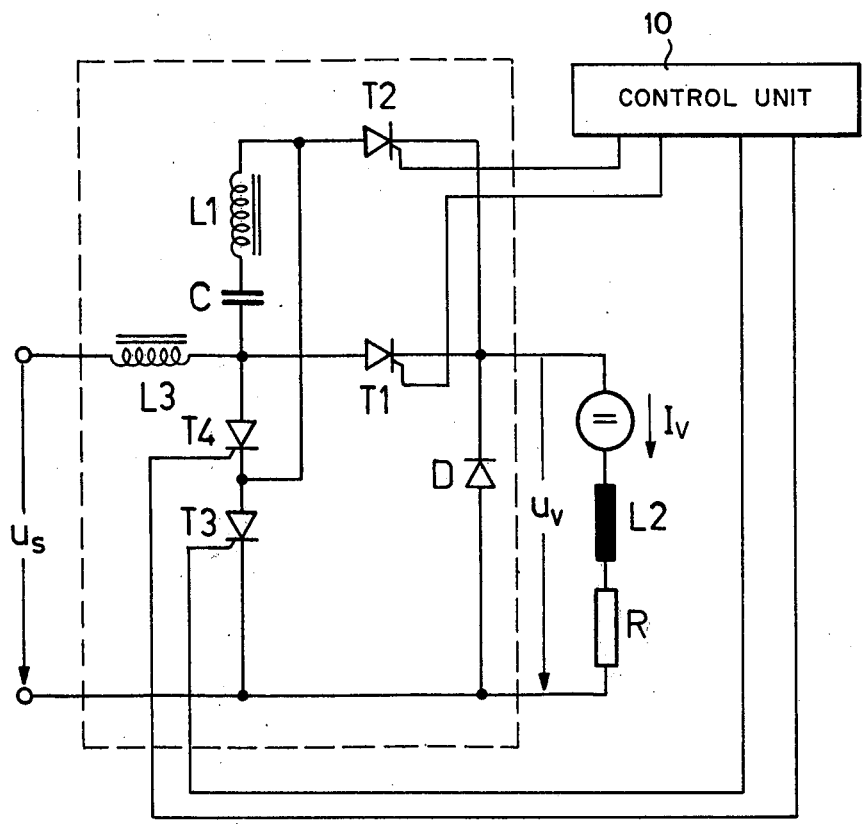
Figure 3:
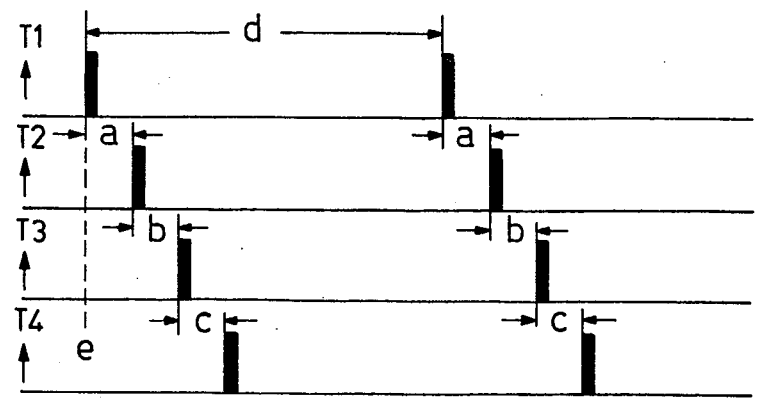
Figure 4:
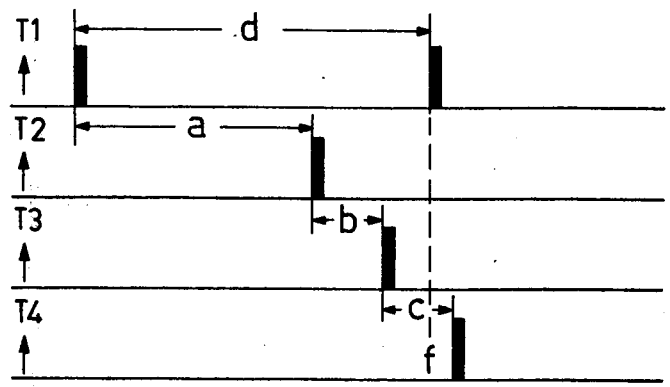
Figure 5:
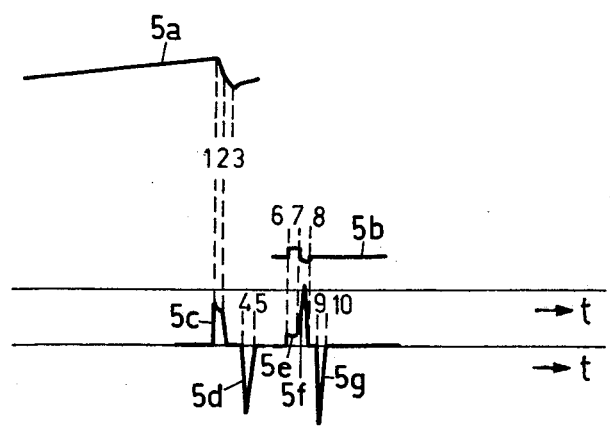
Figure 6:
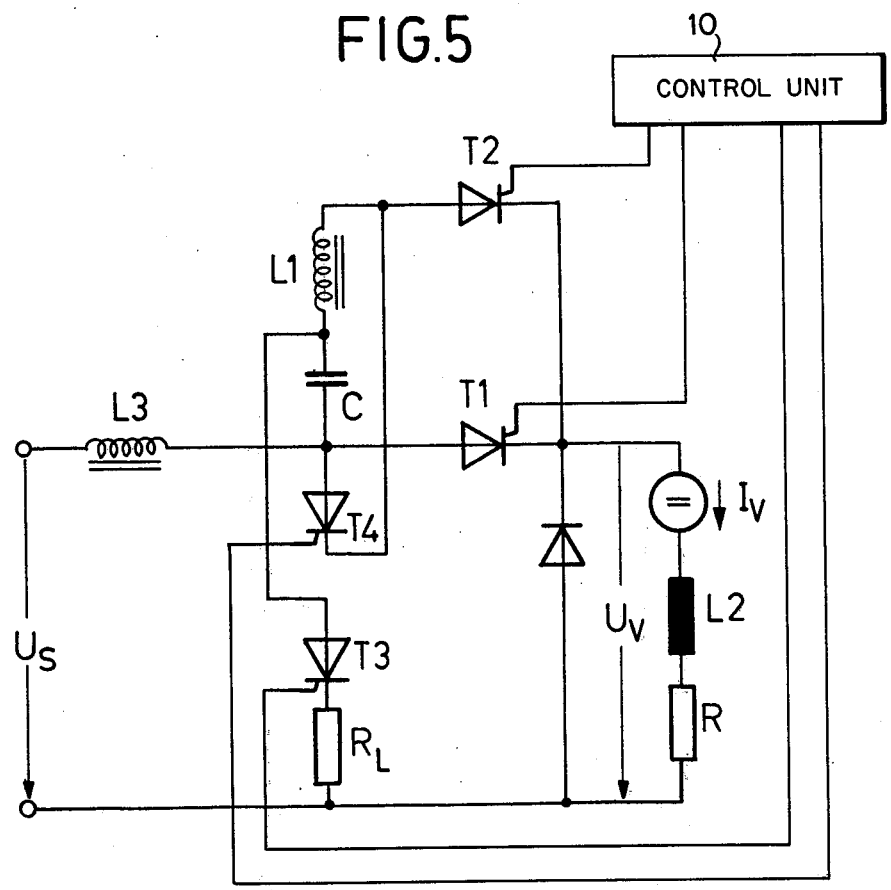

The invention will be explained below in detail on the basis of practical examples which are illustrated by the accompanying drawings wherein:

FIG. 1 shows the above-described known direct current regulator,

FIG. 2 depicts the heavy current section of the circuit arrangement proposed by the invention, FIG. 3 shows timed control pulse positions for a low output voltage of the circuit depicted by FIG. 2, FIG. 4 shows control pulse positions for a high output voltage of the circuit depicted by FIG. 2, FIG. 5 shows time graphs of the currents in the circuit depicted by FIG. 2, and FIG. 6 shows a variant of a circuit limiting the condenser voltage under no-load. Analogous components are denoted by identical reference symbols in FIGS. 1 and 2.

Specifically,

T 1 designates main thyristor
T 2 designates quenching thyristor
T 3 designates charge thyristor
T 4 designates change-over thyristor
D designates free-running diode
C designates quenching condenser
L 1 designates change-over reactor
L 2 designates load reactor
L 3 designates pre-inductance
R designates load resistor
$U_S$ designates supply voltage
$u_V$ designates load or output voltage respectively
$I_V$ designates load current.

These components are connected in the manner described above. Reactors L1 and L3 can be of the iron core type.

Below, the operating mode of the circuit arrangement shown by FIG. 2 will be explained in conjunction with the control method proposed by the invention (components which are significant for the invention are enclosed by the rectangle formed by the broken lines in FIG. 2).

FIG. 3 illustrates the correlation of the control pulses for high and low load, or output voltages respectively. It is based on the premise that a voltage control with constant cycle duration -also called pulse-width control- is applied. At constant cycle duration $d$, the magnitude of the voltage is regulated by the interval $a$. A small interval $a$ stands for a brief switchin time of the main thyristor T 1, and thus a low output voltage (FIG. 3). A large interval $a$ signifies a long switch-in time of the main thyristor T 1 and thus a high output voltage (FIG. 4).

The control method of the invention is based on the arrangement to ignite the charge thyristor T 3 at a specific time interval $b$ after the ignition of the quenching thyristor T 2, if sufficiently removed from the limits of the range of adjustments. The length of this time interval is determined by the data of the quenching process at maximum load current, with the release time of the main thyristor T 1 being added.

The change-over thyristor T 4 on the other hand is ignited at a specific time interval $c$ after the charge thyristor T 3. This time interval must correspond to the current conduction time of the charge thyristor T 3 (half-cycle of the oscillating circuit C - L 1) plus the release time of T 3. Gating of the four thyristors T1 to T4 for their required ignition periods is obtained by means of a control unit 10.

If the output voltage is low (FIG. 3), the delimitation of the pulse positions is accomplished thusly that $a$ can become equal to, but not smaller than 0. If $a = 0$, the control pulse for the main thyristor T 1 will disappear. If the control voltage is adjusted still further, the time interval $b$ will become 0 in the most extreme case. Then, neither the main thyristor T 1 nor the quenching thyristor T 2 will ignite. The load voltage will be 0 but the change over occurrences within the oscillating circuit L 1 - C will run their course undisturbed.

If the output voltage is high (FIG. 4), a delimitation of the pulse positions $(a + b)$  $d$ will be accomplished. If $a + b = d$, the control pulses of the main thyristor T 1 and of the charge thyristor T 3 will coincide. The control pulse for the charge thyristor T 3 now remains in this position, and the time interval $a$ is increased up to the cycle duration $d$. In this case there will be no ignition of the quenching thyristor T 2, and the full supply voltage $U_s$ is applied continuously across the load. The change-over occurrences within the oscillating circuit L 1 - C will run their course undisturbed.

The operating mode of the quenching thyristor T 2 and of the charge thyristor T 3 is also demonstrated by the time graphs for high load current (5a) and low load current (5b).

In the left part of FIG. 5 the main thyristor T 1 is switched on up to the moment of time $t$ 1. Within the time interval $t$ 1 - $t$ 2 the load current (5c) is carried by the quenching thyristor T 2. The free-running valve D, not shown in this current conduction, will then take over the current within the interval $t$ 2 - $t$ 3. At the moment of time t 3 the main thyristor T 1 is ignited. The change-over valve T 4 will recharge the condenser C within the interval $t$ 4 - $t$ 5 (5d)

In the right part of FIG. 5 it is demonstrated that in the case of a low load current (5d) the quenching thyristor T 2 will first carry the current after the quenching of the main thyristor T 1 (5e). Since the charging of the condenser C is not completed at the time of ignition of the charge thyristor, the charge thyristor will take over the charging operation in accordance with its function, speeding up this operation substantially (5f). The change-over operation is again performed by the change-over thyristor T 4 (5g), thus making the circuit arrangement safe for the non-load.

The rise in the condenser voltage at no-load can be held to a safe value by a corresponding ratio of the losses in the inductances L 1 and L 3.

In a further advantageous development of the invention (see FIG. 6 where analogous components are denoted by the same reference symbols as used in FIG. 2) this problem is solved in that manner that the charge thyristor T 3, when in its ignited state, will set up a connection between one pole of the supply voltage and that pole of the condenser C which is not connected with the supply voltage. It will be expedient to add a resistor $R_L$ to this circuit to insure that the charge of the condenser is accomplished at low overshoot. If this specific circuit is used, there will be no significant increase in voltage at no-load, even if the components L 1 and L 3 operate practically loss-free.

The circuit arrangement of the heavy current section and the operation of the gate control proposed by the invention result in the following advantages:

1. The range of adjustments in the direction of maximum as well as minimum output voltage is extended in comparison with known circuit arrangements. The load voltage can be varied continuously from a practically full supply voltage to 0.

2. The range of adjustments will not be limited by low load currents.

3. The condenser charge is not diminished by undesirable interim oscillation occurrences.

4. The main thyristor is unburdened from the change-over current.

5. The change-over reactor Llis effective in both current directions with respect to the condenser C so that specifically defined current slopes (di/dt) will arise. In this manner the main thyristor is relieved of a portion of the switching losses.

6. The use of additional components within the heavy current section is practically limited to two thyristors. Auxiliary valves and reactance coils, used by the known arrangements, are not required.

I claim:

1. In a direct current regulator for a load circuit supplied with current from a voltage source from two main lines, one of said main lines including a main thyristor, a quenching thyristor and a quenching condenser connected in a series circuit which latter is connected in parallel with said main thyristor, a change-over reactor connected to one electrode of said quenching condenser, a change-over thyristor, a connection from one main electrode of said change-over thyristor to the connection line between said quenching thyristor and said quenching condenser, a connection between the other main electrode of said change-over thyristor and the like main electrode of said main thyristor and a control unit connected to the gating electrodes of said thyristors for setting their ignition periods, the improvement wherein the said connection from said one main electrode of said change-over thyristor extends directly to the connection line between said quenching thyristor and said quenching condenser, wherein said change-over reactor is connected in series with said quenching condenser and wherein one main electrode of a charging thyristor is connected directly to a line connecting said quenching thyristor with the series circuit formed by said quenching condenser and said change-over reactor, the other main electrode of said charging thyristor being connected to said other main line.

2. A direct current regulator as defined in claim 1 wherein said change-over thyristor and said charging thyristor are connected in series in the forward direction and wherein the junction point between said change-over and charging thyristors is connected with the junction point of said quenching thyristor with the series circuit constituted by said change-over reactor and quenching condenser.

3. A direct current regulator as defined in claim 1 wherein said change-over reactor is of the iron core type.

4. In a direct current regulator for a load circuit supplied with current from a voltage source from two main lines, one of said main lines including a main thyristor, a quenching thyristor and a quenching condenser connected in a series circuit which latter is connected in parallel with said main thyristor, a change-over reactor connected to one electrode of said quenching condenser, a change-over thyristor, a connection from one main electrode of said change-over thyristor to the connection between said quenching thyristor and said quenching condenser, a connection between the other main electrode of said change-over thyristor and the like main electrode of said main thyristor and a control unit connected to the gating electrodes of said thyristors for setting their ignition periods, the improvement wherein the said connection from said one main electrode of said change-over thyristor extends directly to the connection line between said quenching thyristor and said quenching condenser, wherein said change-over reactor is connected in series with said quenching condenser and wherein one main electrode of a charging thyristor is connected directly to the junction between said series connected quenching condenser and said change-over reactor, the other main electrode of said charging thyristor being connected to said other main line.

5. A direct current regulator as defined in claim 4 wherein the connection between said other main electrode of said charging thyristor and said other main line includes an ohmic resistor.

6. A direct current regulator as defined in claim 4 wherein said change-over reactor is of the iron core type.

7. A direct current regulator as defined in claim 4 wherein said change-over thyristor is connected between that electrode of said quenching condenser which is connected to said one main line from said voltage source and a junction point between said change-over reactor and quenching thyristor and wherein one main electrode of said charging thyristor is connected exclusively to the junction point between said quenching condenser and change-over reactor, the other main electrode of said charging thyristor being connected with said other main line from said voltage source by way of an ohmic resistor.

* * * * *